Jan. 26, 1937.  S. J. NORDSTROM  2,069,013
PLUG VALVE
Filed March 18, 1932  2 Sheets-Sheet 1
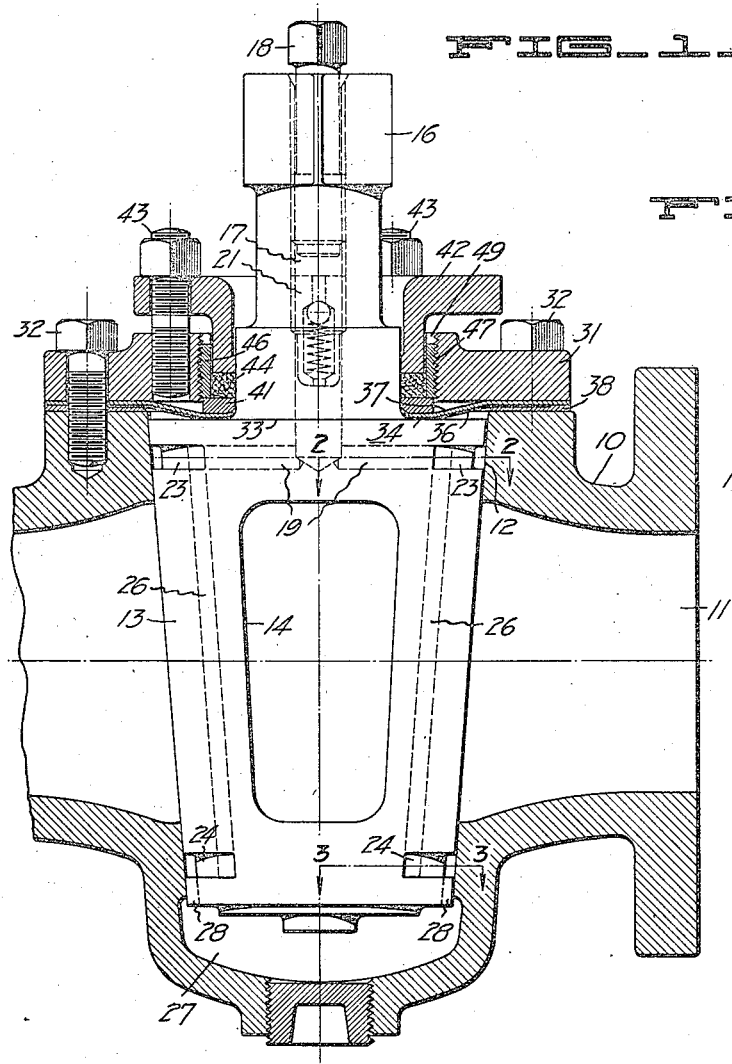
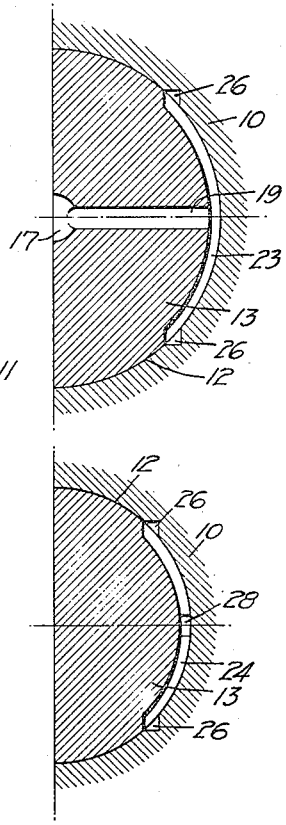
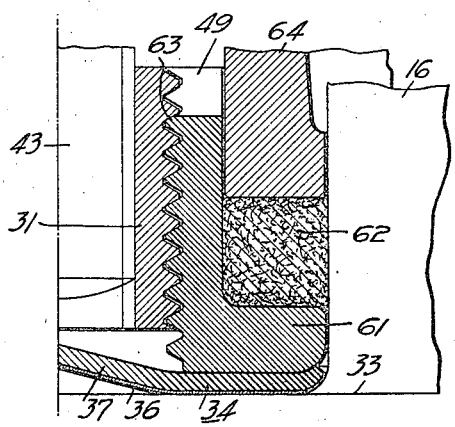
INVENTOR.
Sven J. Nordstrom
BY White, Prost, Hehr & Lothrop
ATTORNEYS.

Jan. 26, 1937. S. J. NORDSTROM 2,069,013
PLUG VALVE
Filed March 18, 1932 2 Sheets-Sheet 2

INVENTOR.
Sven J. Nordstrom
BY
ATTORNEYS.

Patented Jan. 26, 1937

2,069,013

UNITED STATES PATENT OFFICE 2,069,013

PLUG VALVE

Sven Johan Nordstrom, Piedmont, Calif., assignor to Merco Nordstrom Valve Company, San Francisco, Calif., a corporation of Delaware Application March 18, 1932, Serial No. 599,739

5 Claims. (Cl. 251—93)

This invention relates generally to plug valves of the type in which the plug can be jacked longitudinally of its associated seat.

Valves of the above character, as exemplified by Nordstrom Patent No. 1,781,821, commonly utilize adjustable means for yieldingly urging the tapered valve plug into its seat and for preventing leakage of line fluid from the casing at the large end of the plug. When operating upon relatively high pressure lines, practical difficulties are encountered with such valves. Surges in the line fluid frequently cause the plug to be unseated to such an extent as to permit fluid from the line to flow between the valve working surfaces. This may result in impairment of the valve working surfaces through deposits of foreign material, or by corrosion where the line fluid is corrosive in character, so that in time leakage will occur past the plug. Undue unseating movement of the plug is also detrimental where viscous lubricant under pressure is employed for jacking and for injection between the valve working surfaces, in that it permits the line fluid to wash away viscous lubricant, thus tending to cause the reseated valve to stick, and also necessitates the use of undue amounts of lubricant to maintain the valve in proper condition. Repeated jacking or unseating of the plug to too great an extent also tends to deteriorate the resilient element or elements employed to urge the plug into its seat, so as to require frequent adjustments of a take-up member, formed by follower 24 in the valve of said Patent No. 1,781,821, to prevent both leakage past the plug and leakage from the casing. Somewhat the same deleterious effects may result, to a lesser degree, if the plug is permitted to move to too great an extent when jacked hydraulically from its seat, by lubricant under pressure.

It is an object of the present invention to devise a plug valve of the above type in which the extent of longitudinal movement of the plug can be definitely controlled between such limits as to avoid the detrimental effects outlined above. As will be presently explained, in accomplishing this object, I produce a valve characterized by the fact that adjustment of a mechanical element, serves to control the extent of longitudinal movement of the valve plug, although adjustments of this element are substantially independent of the force with which another element or elements serve to yieldingly urge the plug into its seat.

Further objects of the invention will appear from the following description in which the preferred embodiments of the invention are set forth in detail in conjunction with the accompanying drawings. It is to be understood that the appended claims are to be accorded a range of equivalents consistent with the state of the prior art.

Referring to the drawings:

Fig. 1 is a side elevational view, in cross section illustrating a valve incorporating the present invention.

Fig. 2 is a cross sectional detail, taken along the line 2—2 of Fig. 1.

Fig. 3 is a cross sectional detail taken along the line 3—3 of Fig. 1.

Fig. 6 is an enlarged cross sectional detail, illustrating the construction and arrangement of certain parts incorporated in Fig. 5.

Figure 4:
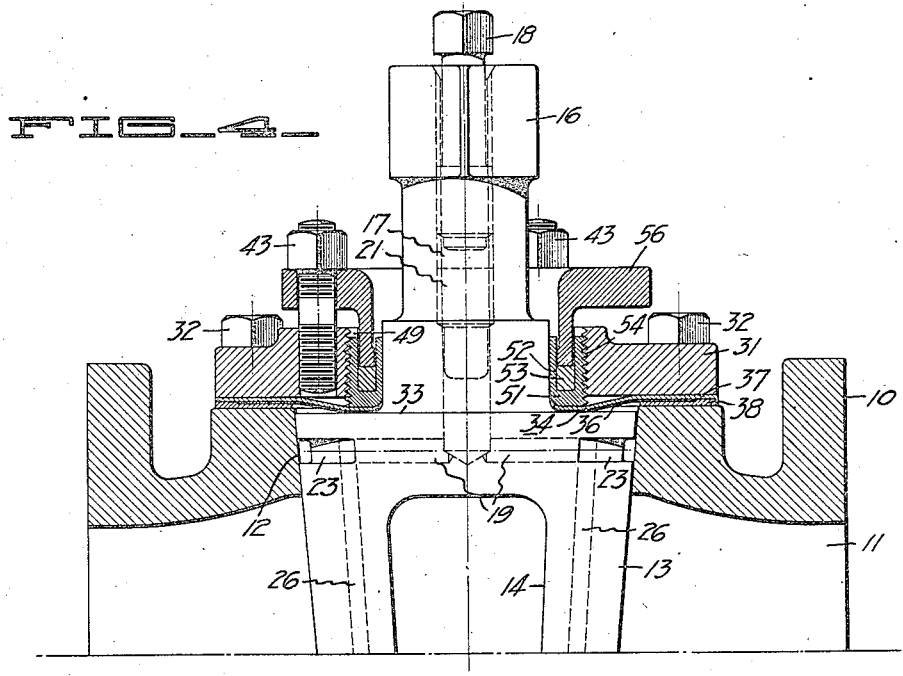
Fig. 4 is a side elevational detail, in cross section, illustrating a modification of the invention.

Referring to Fig. 1, the valve illustrated therein consists of a casing 10, provided with a passageway 11 extending therethrough for flow of fluid. Formed within the casing and extending transversely of passageway 11, there is a tapered or conical shaped valve seat 12. Rotatably positioned within valve seat 12 there is a valve plug 13, provided with an opening 14 adapted to register with passageway 11 for open position of the valve. As representative of suitable means for effecting turning of the valve plug 13 from the exterior of the casing, there is illustrated a conventional valve stem 16 fixed to the large end of plug 13.

As suitable means for jacking the valve, I preferably employ a pressure lubricating system. Thus stem 16 is shown provided with a central bore 17, into which a pressure lubricant screw 18 is threaded. The inner end of bore 17 communicates with radial ducts 19 formed within plug 13, which in turn communicate with lubricant channels interrupting the valve working surfaces, such as will be presently explained. A check valve 21 is shown positioned within bore 17, to prevent back flow of lubricant. It is preferable to utilize relatively viscous lubricant, such as is commonly employed with pressure lubricated plug valves, and which is available upon the market in stick form. Such lubricant can be introduced into bore 17 upon removal of screw 18, and upon reengaging this screw and upon turning the same downwardly, the viscous lubricant is forced through check valve 21, and through ducts 19 to the valve working surfaces.

To afford adequate distribution of viscous lubricant between the valve working surfaces, there is shown an arrangement of lubricant channels incorporating the invention disclosed and claimed in Nordstrom Patent No. 1,731,821. Thus upper and lower pairs of arcuate channels 23 and 24 are formed in the peripheral surface of the plug 13. These channels 23 and 24 are adapted to cooperate with four longitudinal channels 26 formed within the valve casing and interrupting the valve seat. Formed within the casing at the small end of plug 13 there is a closed lubricant chamber 27, which is in communication with arcuate channels 24 through branch channels 28. The outer ends of radial ducts 19 are in communication with arcuate channels 23. With the valve plug 13 in closed position as illustrated in Fig. 1, the end portions of the longitudinal channels 26 are in communication with the end portions of arcuate channels 23 and 24, while arcuate channels 24 are in communication with closed lubricant chamber 27. Therefore for this position of the valve plug, turning down screw 18 causes lubricant to be supplied to all of the lubricant channels, and to the closed chamber 27. If a sufficiently high lubricant pressure is applied to chamber 27, the valve plug is hydraulically jacked from its seat. Likewise the disposition of the lubricant channels described causes the viscous lubricant to be distributed in zones substantially surrounding the fluid passageway 11 to afford a sealed port effect. When the valve plug is in an intermediate position, the two longitudinal channels 26 which are exposed to the line are cut off from communication with arcuate channels 23 and 24, so that no undue extrusion of lubricant can occur.

For closing the casing at the large end of the plug there is shown a cover member or plate 31 secured to the casing 10 by suitable means such as screws 32. Positioned adjacent the inner face of cover member 31, and also adjacent the annular shoulder 33 formed at the large end of the plug, there is a diaphragm 34. This diaphragm 34 is preferably composite or laminated in character, consisting of a lower diaphragm portion 36 formed of relatively thin flexible sheet metal, and an upper diaphragm portion 37 formed preferably of non-metallic composition, as for example a hard resilient or deformable fiber composition which can withstand temperature and other conditions to which the valve is subjected. The outer peripheral edge portion of the diaphragm is clamped between cover member 31 and the adjacent shoulder formed on casing 10, a gasket 38 being shown to aid in effecting sealing. This clamping of the diaphragm 34 not only effects sealing between the diaphragm and the casing, but also sealing between cover member 31 and the casing.

Diaphragm 34 is apertured to accommodate the inner end of stem 16, and positioned upon its inner peripheral portion, there is an annular ring 41 made of suitable material such as metal. Positioned above annular ring 41, there is a suitable follower 42 which is adjustably mounted with respect to cover member 31, as by means of studs 43. Interposed between the inner end of follower 42, and the upper face of ring 41, there is a resilient compressible packing 44 of suitable material as for example one containing asbestos fiber.

With the structure described above, it is evident that when follower 42 is clamped down upon the packing 44, ring 41 will in turn yieldably urge the inner peripheral portion of diaphragm 34 into sealing contact with the annular shoulder 33. However, without the provision of additional means, the extent of longitudinal movement of plug 13, which may be occasioned by hydraulic jacking, or by surges in the line, would be the extent to which packing 44 and gasket 37 might be compressed. In practice it has been found that not only is it difficult to clamp follower 42 down with sufficient force to retain longitudinal movement of plug 13 within proper limits to avoid the deleterious effects of too much longitudinal movement as has been previously explained, but if such adjustment is attempted, packing 44 which provides the major seating resilience for the plug will not retain its desired resilience, so that frequent adjustments of the follower and repacking are required. In other words, in a high pressure valve of this character it is impractical to rely entirely upon the resilient resistance of packing 44 to limit the extreme movement thereof.

In order to properly limit longitudinal movement of plug 13 away from its seat, and at the same time be able to adjustably effect such limiting substantially independently of the resilient packing 44, I provide an adjustable stop member 46, which in the present instance is in the form of a sleeve having a threaded connection 47 with the cover member 31. The shoulder formed upon the lower end of stop member 46, is adapted to engage ring 41, thus limiting movements of this ring against the resilient packing 44. Unless the separation of the plug from its seat is limited, the lubricant is apt to channel its way over the seat into the ports without becoming evenly distributed over the seating surface, and thereby line fluid is permitted to enter and contact with certain portions between the plug and valve surfaces. By limiting the lift of the plug, or the separation of the plug from its seat within certain limits, the lubricant is compelled to spread over the entire surface which prevents entrance of line fluid to the seating surface.

In assembling the valve described above, after the plug has been positioned within the casing, and cover member 31 clamped upon the casing and upon diaphragm 34, ring 41 is positioned upon the inner peripheral portion of the diaphragm. Stop member 46, which is provided with slots 49 for the convenient engagement of a wrench or other tool, is then screwed down through cover member 31. The lower end of stop member 46 engages with ring 41, and further turning down causes the inner peripheral portion of the diaphragm to be brought into fairly firm contact with the annular shoulder 33 on the large end of the plug. Packing 44 is then introduced between stop member 46 and the stem 16, and is compressed by follower 42. Packing 44 is compressed to such an extent as to exert a sufficient force through ring 41 and diaphragm 34, to hold the plug 13 into its seat under normal operation. Now if in service the valve is subjected to relatively high pressure surges, sufficient to force plug 13 longitudinally in a direction away from its seat, such movement is definitely limited by engagement of ring 41 with stop member 46. At the same time, sufficient movement will be permitted between the plug and stop member 46 by virtue of the slightly compressible character of the non-metallic portion 37 of diaphragm 34, to permit the plug to be jacked from its seat by turning down screw 18, in the event the plug becomes fast with respect to the casing. In this connection note that while composition portion 37 of diaphragm 34 may be initially compressed a slight amount, it affords only a little resilient seating force upon compression. Therefore the aggregate means for limiting travel of the plug away from its seat may be said to be substantially non-resilient. With respect to the extent of movement of plug 13 permitted under any condition, it is preferable that stop member 46 be so adjusted that the plug in no event can move from its seat a sufficient amount to form a clearance between the plug and the valve seat sufficiently great as to permit free flow of fluid between the valve working surfaces. In other words, only sufficient longitudinal movement of the plug is permitted in order to enable a film of viscous lubricant to be extruded between the valve working surfaces, without permitting such clearance to be formed as to permit detrimental introduction of foreign material from the line. This principle of limited lift or travel is of particular advantage as a practical means of overcoming leakage which results from the plug being separated from the valve seat beyond the point at which the lubricant between the plug and seat can successfully function as a sealing medium. While the plug may be freed from the seat, when stuck, by separation, the amount of separation is definitely limited to maintain as small a space as possible between the plug and seat. A separation beyond the set amounts weakens the efficiency of the sealing medium. Continued separation results in breaking of the seal which not only permits the flow of line fluid to portions of the plug but contributes to packing deterioration since the line fluid which may be acids, alkalies, solvents, etc., may contact therewith.

Stop member 46 is made adjustable, both for the purpose of adjusting the extent of longitudinal movement of the plug to compensate for inaccuracies in manufacture, and (since this stop member is adjustable from the exterior of the valve) to permit such adjustment if such occasion should arise, after the valve is assembled and in operation. The ability to adjust after the valve has been assembled and in operation is of marked advantage since the valve covers have a tendency to spring depending upon the pressure to which they are subjected and the size of the valve, and stop member 46 may then be adjusted to limit the lift or travel of the plug to suit the particular conditions of line pressure and the valve dimensions. It is characteristic of my valve that the resilient packing 44, or other means employed of a resilient character, acts upon the plug to hold the same within its seat during normal operation, substantially independently of positioning of stop 46. Likewise the forces upon packing 44 can at no time be greater than that occasioned when longitudinal movement of the plug is being limited by stop 46. Furthermore the compression of packing 44 can be adjusted independently of the positioning of stop 46.

A modification of the invention is illustrated in Fig. 4, in which the force exerted by the resilient means, is transmitted through the stop member, and in which limited movement is permitted between the stop member and the casing cover member 31. In this case the stop member 51 is likewise annular in form and is made of suitable material such as metal. It is provided with an annular recess 52 adapted to receive a resilient packing material 53. The shoulder formed by the lower end of stop member 51 acts upon the inner peripheral portion of diaphragm 34. The stop member also has a relatively loose threaded connection 54 with cover member 31, whereby it can move a limited amount in a direction parallel to the axis of the plug. Resilient packing 53 is adapted to be compressed by follower 56, corresponding to follower 42 of Fig. 1. In assembling the valve of Fig. 4 stop member 51 is turned down a sufficient distance to bring the inner peripheral portion of diaphragm 34 into fairly firm contact with the annular shoulder 33 formed upon the large end of plug 13. Follower 56 is then clamped down tightly upon the resilient packing 53. Upon clamping down the follower 56 a certain amount of compression of the non-metallic portion 37 of the diaphragm occurs, so that stop member 51 moves downwardly a further amount permitted by the loose character of the threaded connection 54. A limited amount of longitudinal movement of plug 13 in a direction away from its seat is now permitted, but such movement is definitely controlled and limited by threaded connection 54.

Figure 5:
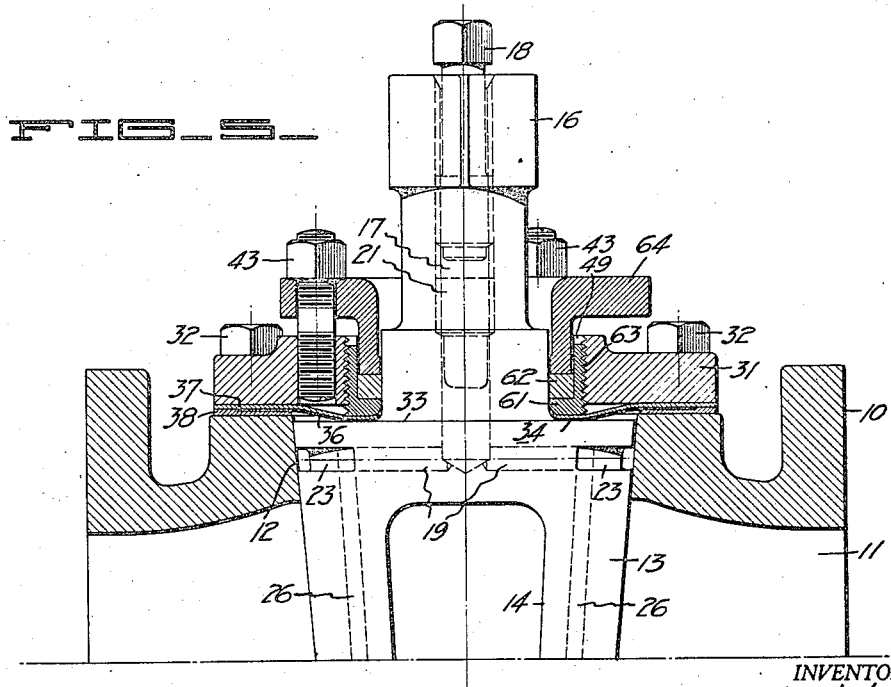
Fig. 5 is a view similar to Fig. 4 illustrating a further modification.

The modification of Fig. 5 is similar to that of Fig. 4, except that the stop member in this case is so formed as to permit the resilient packing material to contact with the periphery of the valve stem. Thus the stop member 61 in this case is counterbored to accommodate the resilient packing material 62. Stop member 61 likewise is provided with a relatively loose threaded connection 63 with the cover member 31, and the packing 62 is compressed by follower 64. Fig. 6 illustrates in detail the character of the loose threaded connection 63. As illustrated in this figure stop member 61 is at its upper limit of movement with respect to the cover member 31.

I claim:

1. In a plug valve, a casing having a passageway therethrough for flow of fluid and formed to provide a tapered seat extending transversely of the passageway, a valve plug rotatably disposed within said seat, a pressure lubricating system for effecting hydraulic jacking of the plug from its seat and for introducing viscous lubricant between the valve working surfaces, there being an annular shoulder formed upon the large end of the plug, a flexible diaphragm positioned adjacent the large end of the plug and having its outer peripheral portion sealed with respect to the casing, resilient means serving to press the inner peripheral portion of said diaphragm into contact with the shoulder on the large end of the plug, thereby urging the plug into its seat, and adjustable means for controlling the maximum permissible longitudinal movement of said plug in a direction away from its seat.

2. In a plug valve, a casing having a passageway therethrough for flow of fluid and formed to provide a tapered seat extending transversely of the passageway, a valve plug rotatably disposed within said seat, a pressure lubricating system for effecting hydraulic jacking of the plug from its seat and for introducing viscous lubricant between the valve working surfaces, there being an annular shoulder formed on the large end of the plug, a flexible diaphragm positioned adjacent the large end of the plug and having its outer peripheral portion sealed with respect to the casing, a resilient element acting upon an inner annular portion of the diaphragm against said shoulder to urge the plug into said seat, and adjustable stop means serving to limit compression of said element by longitudinal movement of the plug in a direction away from its seat, and also serving to limit the extent of such movement.

3. In a plug valve, a casing having a passageway therethrough for flow of fluid and formed to provide a tapered seat extending transversely of the passageway, a valve plug rotatably disposed within said seat, a pressure lubricating system for effecting hydraulic jacking of the plug from its seat and from introducing viscous lubricant between the valve working surfaces, there being a shoulder formed upon the large end of the plug, a cover member secured to the casing and extending over the large end of the plug, a flexible diaphragm positioned adjacent the large end of the plug and having its outer peripheral portion interposed between said cover member and said casing, a resilient element serving to urge an inner annular portion of said diaphragm into sealing contact with said shoulder, thereby urging the plug into its seat, and an adjustable stop member carried by said cover member, and serving to limit compression of said element by longitudinal movement of the plug in a direction away from its seat and also serving to control the extent of such longitudinal movement.

4. In a plug valve, a casing having a passageway therethrough for flow of fluid and formed to provide a tapered seat extending transversely of the passageway, a valve plug rotatably disposed within said seat, a pressure lubricating system for effecting hydraulic jacking of the plug from its seat and for introducing viscous lubricant between the valve working surfaces, there being a shoulder formed on the large end of the plug, a cover member secured to the casing and extending over the large end of the plug, a flexible diaphragm positioned adjacent the large end of the plug and having its outer peripheral portion interposed between said cover member and the casing, a resilient element serving to force an inner annular portion of said diaphragm into contact with said shoulder, thereby urging the plug into its seat, and an annular adjustable stop member carried by said cover member and serving to limit compression of said element by longitudinal movement of the plug in a direction away from its seat and also serving to control the extent of such movement.

5. In a plug valve, a casing having a passageway therethrough for flow of fluid and formed to provide a tapered seat extending transversely of the passageway, a tapered valve plug rotatably disposed within said seat, a pressure lubricating system for effecting hydraulic jacking of the plug from its seat and for introducing viscous lubricant between the valve working surfaces, said plug having a shoulder formed on its large end, a cover member secured to the casing and extending over the large end of the plug, a flexible diaphragm positioned adjacent the large end of the plug and having its outer peripheral portion interposed between said cover member and said casing, a resilient element acting to force an inner annular portion of said diaphragm against said shoulder, whereby the plug is urged into its seat, a follower adjustably carried by said cover member and adapted to apply force to said resilient element, and independently adjustable stop means serving to limit compression of said element by longitudinal movement of the plug in a direction away from its seat and also serving to control the extent of such movement.

SVEN JOHAN NORDSTROM.